(12) United States Patent
Størksen et al.

(10) Patent No.: US 8,842,297 B2
(45) Date of Patent: Sep. 23, 2014

(54) METHOD FOR MEASUREMENT OF THE THICKNESS OF ANY DEPOSIT OF MATERIAL ON INNER WALL OF A PIPELINE

(75) Inventors: Kjell Bjørnar Størksen, Oslo (NO); Rainer Hoffmann, Skien (NO); Lene Amundsen, Porsgrunn (NO)

(73) Assignee: Statoil Petroleum AS, Stavanger (NO)

( * ) Notice: Subject to any disclaimer, the term of this patent is extended or adjusted under 35 U.S.C. 154(b) by 242 days.

(21) Appl. No.: 13/130,664

(22) PCT Filed: Nov. 23, 2009

(86) PCT No.: PCT/NO2009/000401
§ 371 (c)(1),
(2), (4) Date: Jun. 17, 2011

(87) PCT Pub. No.: WO2010/059065
PCT Pub. Date: May 27, 2010

(65) Prior Publication Data
US 2011/0235057 A1   Sep. 29, 2011

(30) Foreign Application Priority Data
Nov. 24, 2008   (NO) .................................. 20084944

(51) Int. Cl.
*G01B 11/28* (2006.01)
*G01B 11/06* (2006.01)
*G01B 11/12* (2006.01)
*B24B 37/013* (2012.01)

(52) U.S. Cl.
CPC ............ *G01B 11/0616* (2013.01); *G01B 11/12* (2013.01); *B24B 37/013* (2013.01); *G01B 11/0625* (2013.01)

USPC ........... 356/630; 356/625; 356/608; 382/141; 250/559.22

(58) Field of Classification Search
CPC ........... G01B 11/0625; G01B 11/0683; G01B 11/06; B24B 37/013; B24B 49/12
USPC ................... 356/625, 630, 601–620; 382/141
See application file for complete search history.

(56) References Cited

U.S. PATENT DOCUMENTS

| | | | | |
|---|---|---|---|---|
| 4,967,092 A * | 10/1990 | Fraignier et al. | ......... | 250/559.07 |
| 7,233,878 B2 * | 6/2007 | Mitrovic et al. | ............. | 702/182 |
| 7,312,454 B2 * | 12/2007 | Safai et al. | .................... | 250/347 |
| 7,353,141 B2 * | 4/2008 | Mitrovic et al. | ............. | 702/182 |

(Continued)

FOREIGN PATENT DOCUMENTS

DE   37 06 660 A1   9/1988
GB   2 329 244 A    3/1999

*Primary Examiner* — Tarifur Chowdhury
*Assistant Examiner* — Isiaka Akanbi
(74) *Attorney, Agent, or Firm* — Birch, Stewart, Kolasch & Birch, LLP

(57) ABSTRACT

A method is provided for measurement of the thickness of any deposit of material on the inner wall of a pipeline at least partly filled with a medium including hydrocarbons, the medium being for instance oil or natural gas, wherein the method includes: projecting infrared light onto the inner wall of the pipeline along a line corresponding to the intersection between the inner wall of the pipeline and a cross-sectional plane of the pipeline; registering an image of the infrared light projected on the inner wall of the pipeline; and determining the thickness of any deposit of material on the inner wall of the pipeline based on the registered image.

22 Claims, 3 Drawing Sheets

(56) References Cited

U.S. PATENT DOCUMENTS

| | | | |
|---|---|---|---|
| 7,612,878 B2 * | 11/2009 | Frey | 356/241.1 |
| 2003/0198374 A1 | 10/2003 | Hagene et al. | |
| 2004/0114793 A1 | 6/2004 | Bondurant et al. | |
| 2008/0146120 A1 * | 6/2008 | Ravid et al. | 451/6 |
| 2009/0033942 A1 * | 2/2009 | Ravid et al. | 356/448 |

\* cited by examiner

METHOD FOR MEASUREMENT OF THE THICKNESS OF ANY DEPOSIT OF MATERIAL ON INNER WALL OF A PIPELINE

FIELD OF THE INVENTION

The present invention relates to a method for measuring the thickness of any deposit of material on the inner wall of a pipeline, for instance an oil pipeline.

BACKGROUND OF THE INVENTION

Deposition of for instance wax on the inner wall of oil pipelines is a severe problem in today's oil production infrastructure. When warm oil flows through a pipeline with cold walls, wax will precipitate and adhere to the walls. This in turn will reduce the pipeline's cross-sectional area, which without counter measures will lead to a loss of pressure and ultimately to a complete blockage of the pipeline.

To this end, it is of interest to measure or otherwise determine the thickness of any deposit of material on the inner wall of a pipeline.

Known techniques for measuring or otherwise determining the thickness of any deposit of material on the inner wall of a pipeline include pressure pulsing and measuring the deposit removed in a pig (pipeline inspection gauge) removal operation.

However, a drawback with pressure pulsing is that the accuracy is low. Further, measuring the deposit removed in a pig removal operation gives no information about the deposit distribution along the pipeline.

SUMMARY OF THE INVENTION

It is an object of the present invention to at least partly overcome the above problems, and to provide an improved method for measurement of the thickness of any deposit of material on the inner wall of e.g. an oil pipeline.

This object, and other objects that will be apparent from the following description, is achieved by a method according to the appended independent claim. Further embodiments are set forth in the appended dependent claims.

According to an aspect of the present invention, there is provided a method for measurement of the thickness of any deposit of material on the inner wall of a pipeline at least partly filled with a medium including hydrocarbons, the medium being for instance oil or natural gas, wherein the method comprises: projecting infrared light onto the inner wall of the pipeline along a line corresponding to the intersection between the inner wall of the pipeline and a cross-sectional plane of the pipeline; registering an image of the infrared light projected on the inner wall of the pipeline; and determining the thickness of any deposit of material on the inner wall of the pipeline based on the registered image.

Experiments show that the deposit thickness may be measured with a high accuracy of about 0.1 mm by means of the present invention.

The projected light may be emitted at about 1100 nm-1700 nm in wavelength, preferably at about 1300 nm-1675 nm in wavelength, and more preferably at about 1550 nm -1625 nm in wavelength. Oil and asphaltenes absorb heavily at about 1100 nm, but the absorption disappears at about 1600 mn. Further, water absorbs heavily between about 1400 and 1600 nm. On the other hand, light sources and photosensors for wavelengths above 1600 nm are not readily available. Hence, by using infrared light at about 1600 nm, measurements can be efficiently effectuated in filled pipes, either with oil or multiphase compositions of gas/water/oil.

The method may further comprise determining any variations in thickness of any deposit of material on the inner wall of the structure along said line. A multi-phase flow (e.g. water and oil) through for instance a pipeline may result in a deposit or deposition occurring inhomogeneously around the pipeline inside circumference. Determining the variation in deposit thickness is important both for research and development purposes, but also for issues like e.g. corrosion where it is important to determine the weakest part, i.e. the most corroded one. Alternatively or complementary, the average deposit thickness along the entire said line may be determined.

The method may further comprise determining the flow regimen in a multiphase flow in the pipeline based on the determined variation in thickness.

In one embodiment or embodiments, said medium is flowing or conveyed in the pipline, and wherein the step of projecting infrared light onto the inner wall of the pipeline along a line corresponding to the intersection between the inner wall of the pipeline and a cross-sectional plane of the pipeline and the step of registering an image of the infrared light projected on the inner wall of the pipeline are performed by a device moved longitudinally within the pipeline by means of said flowing or conveyed medium.

In one embodiment or embodiments, the step of determining the thickness of any deposit of material on the inner wall of the pipeline based on the registered image includes comparing the registered image with a previous image of the inner wall of the pipeline or with the known inner diameter of the pipeline without deposit. The previous image may be provided in a preliminary measurement.

The present invention may further relate to the following:

According to an aspect, there is provided a device for optical measurement of the thickness of any deposit of material on the inner wall of a structure, which device is placeable inside the structure and comprises: a light source unit adapted to project infrared light onto the inner wall of the structure along a line corresponding to the intersection between the inner wall of the structure and a cross-sectional plane of the structure; at least one infrared photosensor or camera adapted to register an image of the infrared light projected on the inner wall of the structure; and means for providing the image registered by the at least one infrared photosensor or camera to a processing means adapted to determine the thickness of any deposit of material on the inner wall of the structure based on the registered image.

In one embodiment, the light source unit comprises a laser adapted to emit light at about 1100 nm-1700 nm in wavelength, preferably at about 1300 nm-1675 nm in wavelength, and more preferably at about 1550 nm- 1625 nm in wavelength.

In one embodiment, the processing means is further adapted to determine the thickness of any deposit of material on the inner wall of the structure by comparing the registered image with a previous image of the inner wall of the structure without any deposit of material. Alternatively, the thickness of any deposit of material on the inner wall of the structure may be determined by comparing the registered image with a previous image of the inner wall of the structure including a deposit of material with known thickness.

In one embodiment, the processing means is further adapted to determine any variations in thickness of any deposit of material on the inner wall of the structure along said line.

In one embodiment, the light source unit comprises a laser and a conical mirror. Instead of a conical mirror, a rotating mirror or reflector may be used, e.g.

In one embodiment, the processing means is included in the device. In this case, the means for providing the image registered by the at least one infrared photosensor or camera to the processing means may simply be a direct connection between the camera and the processing means. Alternatively, the processing means may be an external processing means. In this case, the means for providing the registered image to the processing means may for instance be a removable memory or a transmitter.

In one embodiment, the structure is a pipeline (e.g. an oil or gas pipeline), and device is a probe moveable longitudinally within the pipeline.

In one embodiment, the device is connectable to, or form part of, a pipeline inspection gauge (pig). The pig may provide for transportation of the device through the structure.

In one embodiment, the structure is adapted to convey a flow of fluid, and said cross-sectional plane of the structure is perpendicular to the flow direction of said fluid. The fluid may for instance be oil or natural gas. In e.g. a long oil pipeline, the oil's flow direction generally corresponds to the longitudinal direction of the pipeline.

According to another aspect, there is provided a method for optical measurement of the thickness of any deposit of material on the inner wall of a structure, the method comprising: projecting infrared light onto the inner wall of the structure along a line corresponding to the intersection between the inner wall of the structure and a cross-sectional plane of the structure; registering an image of the infrared light projected on the inner wall of the structure; and processing the registered image for determining the thickness of any deposit of material on the inner wall of the structure based on the registered image. Advantages and features of this aspect are analogous to those of the previously described aspect(s), and vice versa.

In one embodiment, the structure is a pipeline at least partly filled with a fluid, for instance oil.

BRIEF DESCRIPTION OF THE DRAWINGS

The present invention will now be described in more detail, with reference to the appended drawings showing currently preferred embodiments of the invention.

DETAILED DESCRIPTION

Figure 1:
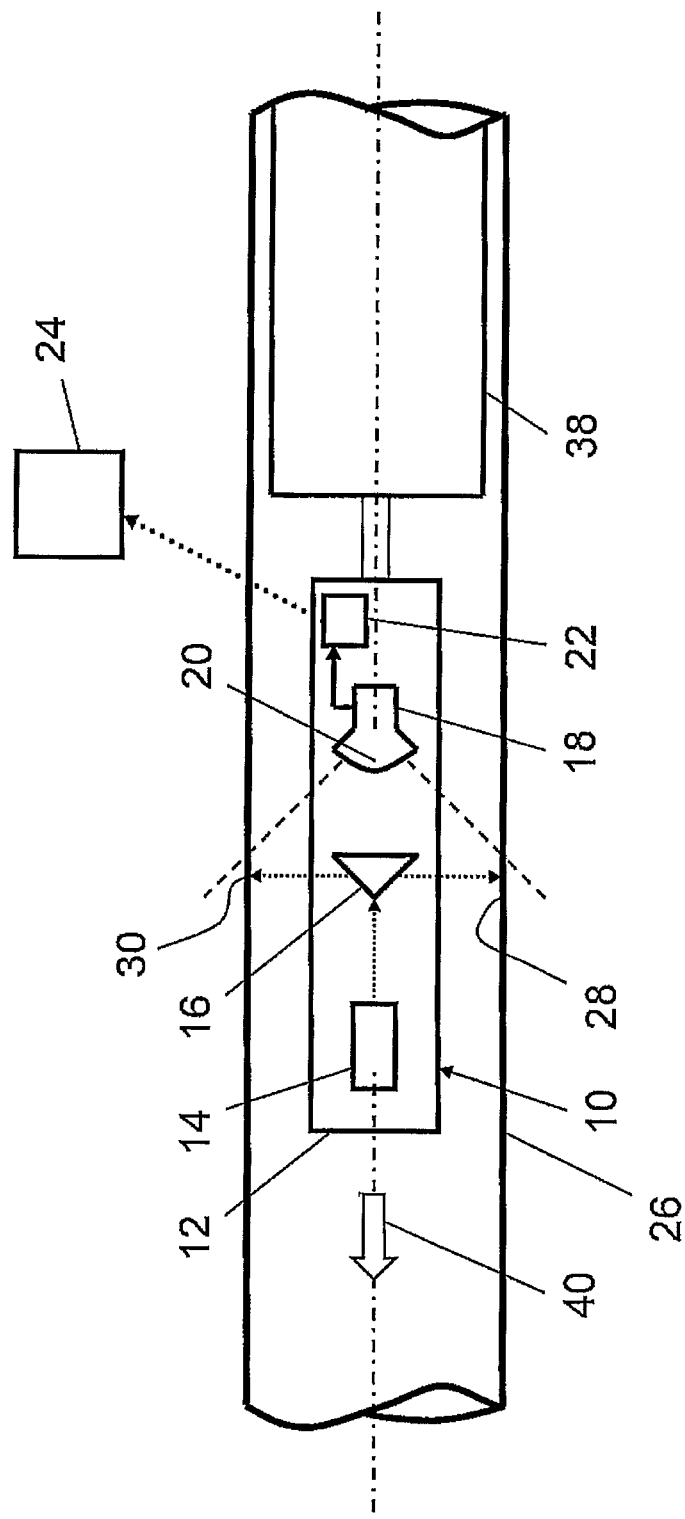
FIG. 1 schematically illustrates a measurement device useful for carrying out the present invention.

In FIG. 1, there is schematically illustrated a measurement device, namely a probe 10, for carrying out the present invention.

The probe 10 comprises an elongated mechanical support structure 12 on which a laser light source 14 and a 360 degree reflector or mirror 16 are mounted. The laser 14 is adapted to emit infrared (IR) light. IR light is generally construed as ER radiation having wavelengths between about 700 nm and 1 mm. Specifically, the laser 14 is adapted to emit IR light at a wavelength of about 1600 nm The laser 14 is arranged so as to emit the IR light in a beam along the longitudinal axis of the probe 10. The 360 degree reflector or mirror 16 is preferably a conical mirror. The conical mirror 16 is disposed with its apex facing the laser 14 and its axis coincident with the longitudinal axis of the probe 10. The conical mirror 16 is further arranged such that the IR beam emitted by the laser 14 is distributed over substantially 360 degrees in substantially one plane perpendicular to the longitudinal axis of the probe 10.

The probe 10 further comprises least one digital IR photosensor or camera 18 generally adapted form an image using infrared radiation. The camera 18 is mounted to the support structure 12. Specifically, the camera 18 is disposed at a fixed and known axial distance from the laser 14 and mirror 16 on the opposite side of the mirror 16 compared to laser 14, with its lens 20 directed towards the base of conical mirror 16 with its optical axis preferably coincident with the longitudinal axis of the probe 10.

The probe 10 further comprises a removable memory 22. The memory 22 is adapted to store images captured by the camera 18, and is used for providing the images to an external processing means 24. The probe 10 and processing means 24 here form part of a system for determining the thickness of any deposit of material on the inner wall of a pipeline by means of optical measurement.

The probe 10 may further comprise additional elements not shown in the drawings, for instance a power source for powering e.g. the laser 14 and camera 18, allowing independent operation of the probe 10.

The basic operation of the probe 10 will now be described. In use, the probe 10 is placed inside a structure, namely a tube or pipeline 26 for conveying a medium including hydrocarbons. A medium including hydrocarbons may for instance be oil or natural gas. Oil and natural gas contain components (e.g. wax, hydrate, scale, etc.) that possibly deposit on the pipe wall as the oil or gas streams or flows through the pipeline. Other deposits that can be measured by means of the present invention include sand and corrosion.

Figure 2:
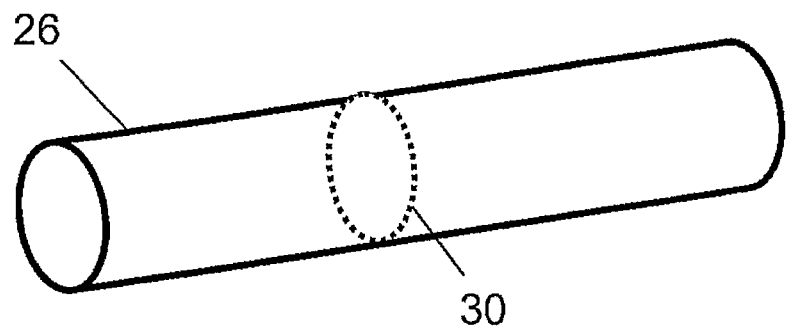
FIG. 2 is a schematic perspective view of the pipeline of FIG. 1.

As the laser 14 is activated inside the pipeline 26, the emitted IR beam is projected via the conical mirror 16 onto the inside or inner wall 28 of the pipeline 26 along a line 30 (see FIG. 2) corresponding to the intersection between the inner wall 28 of the pipeline and a cross-sectional plane of the pipeline. The resulting IR laser projection along the line 30, which line 30 runs along the inner circumference of the pipeline 26, is then captured and registered by the IR camera 18.

In other words, as the laser 14 is activated, the emitted IR light is caused to fall onto the inner wall 28 along the line 30, whereby the line 30 is illuminated by infrared light. Then, infrared light reflected from the line 30 is registered by the camera 18.

Figure 3:
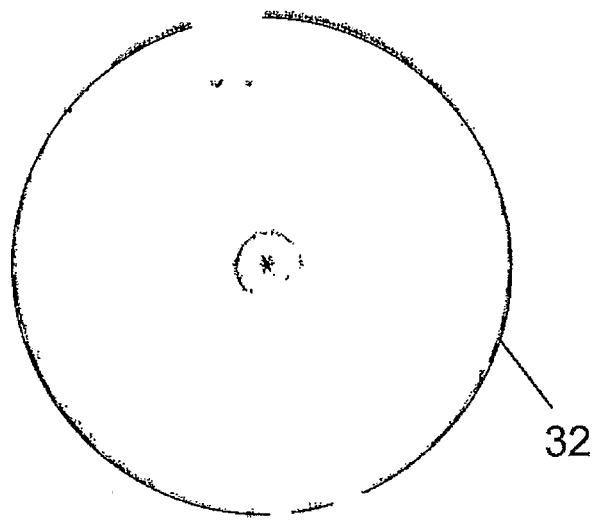
FIG. 3 shows an exemplary image captured by the camera of the device of FIG. 1.

The distance between the mirror 16 and the camera 18 in combination with the focal length of the lens 20 should be appropriately selected to be able to capture the complete projection on the inner wall 28 of the pipeline 26. For a pipeline with a circular cross-section, the image registered by the camera 18 will show basically a circle 32 corresponding to the inner profile of the pipeline 26, as illustrated in FIG. 3. The diameter of the circle 32 will generally decrease with increased deposit of material on the inner wall 28 of the pipeline 26.

The image registered by the camera 18 is stored in the removable memory 22. Then, the probe 20 is removed from the pipeline 26 or otherwise accessed, and the memory 22 is removed from the probe 10 and connected to the processing means 24 so that the registered image may be transferred to the processing means 24. The processing means 24 comprises a software module which analyses the image and detects from a number of sampling points of the circle 32 representing the IR laser projection an averaged pipeline diameter (diameter of circle 34 in FIG. 4) including any deposit on the inner wall 28 of the pipeline 26. It should be noted that the averaged pipeline diameter including any deposit may be determined even though the circle 32 is not entirely complete.

Figure 4:
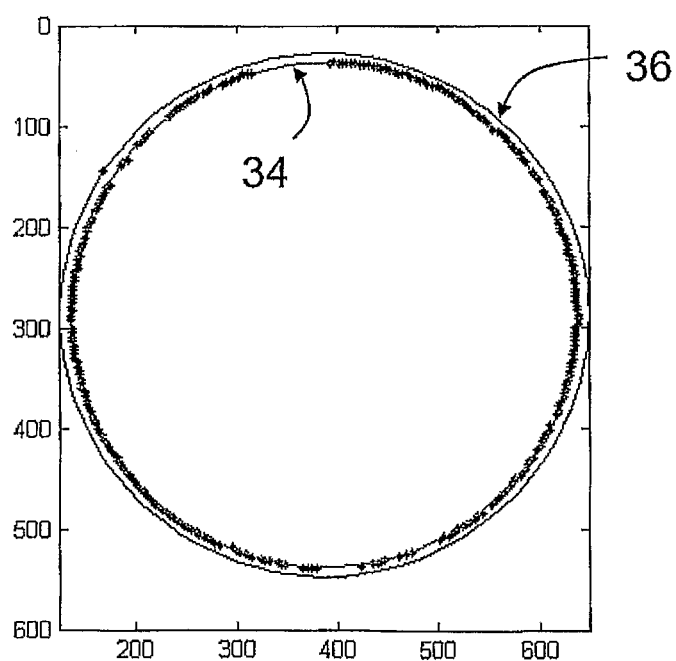
FIG. 4 illustrates how the processing means may determine the deposit thickness.

Then, the processing means 24 may determine the average deposit thickness by comparing the averaged pipeline diameter including deposits to the known pipeline diameter without deposits (diameter of circle 36 in FIG. 4). The average deposit thickness is equal to (diameter$_{circle\ 36}$-diameter$_{circle\ 34}$)/2. The known pipeline diameter without deposit may for instance be determined from a previous image produced by the probe 10, as will be explained further below. Alternatively, the known pipeline diameter without deposit may just be the inner diameter according to the pipeline specification. Experiments show that the deposit thickness may be measured with an accuracy of 0.1 mm by means of the present invention.

Figure 5:
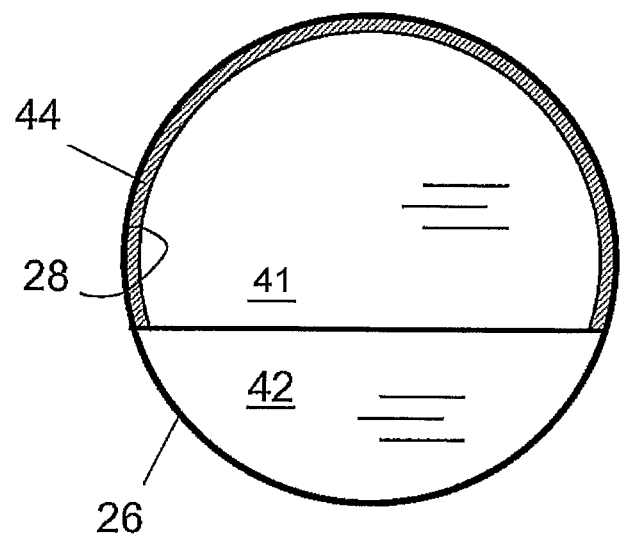
FIG. 5 illustrate a cross-section of a pipeline with non-uniform deposition along the pipeline circumference.

The processing means 24 may further be adapted to determine any variations in thickness of any deposit of material along the inside circumference of the pipeline 26. Having a multi-phase flow in the pipeline, the deposition will not necessarily occur homogeneously around the pipeline circumference, as illustrated in FIG. 5. With a two-phase stratified oil-water flow (41-42), deposit 44 will only occur in the upper sector where the oil 41 is in contact with the pipeline wall 28. However, this non-uniform deposit of material will indeed show on the image captured by the camera 18, allowing the processing means 24 to determine the variation in deposit thickness along the circumference. The processing means 24 may for instance split or divide the circumference into a plurality of (circular) sectors, detect the average radius for each sector from the registered image, and compare the average radius for each sector with the known radius of the pipeline. The more sectors, the more detailed determination, and vice versa. Also, each sampling point of the circle 32 could be analysed to determine variations in deposit around the inside circumference of the pipeline 26. In this embodiment, the orientation of the probe 10, namely any rotation of the probe about its longitudinal axis, should be known to ensure correct measurement. For this, the probe 10 may be equipped with appropriate means (not shown) for detecting said orientation of the probe. Said means may for instance comprise an acceleration sensor. The detected orientation may be taken into account by the processing means 24 when determining any variations in thickness of any deposit of material along the inside circumference of the pipeline 26.

Measuring the variation in deposit thickness along the inner circumference may also be used to derive or determine the flow regimen in a multiphase flow. For instance, if it is known that the pipeline contains oil and water and the deposit is homogeneously distributed (i.e. no variation in deposit thickness along the inner circumference), the flow has to be fully dispersed (e.g. water droplets dispersed in oil). If the deposit looks like in FIG. 5, the flow may be completely stratified. Something in between these two extremes indicates wavy/slug flow. Determining the flow regimen may for instance be perfomed by the processing means 24.

An example of a routine for surveying or monitoring the pipeline 26 will now be described. First, in a preliminary stage, the probe 10 is inserted into the pipeline 26 when there is substantially no deposit on the inner wall 28 of the pipeline, for instance just after the pipeline has been brought into use or just after cleaning of the pipeline. Preferably, the probe 10 is centrally positioned in the pipeline 26 with respect to the cross-section of the pipeline, to facilitate the measurement. The probe 10 may be mechanically connected to a conventional pipeline inspection gauge (pig) 38 (see FIG. 1) for transportation of the probe 10 through the pipeline 26. A pipeline inspection gauge is generally propelled by the pressure of the product in the pipeline. Hence, as oil streams though the pipeline 26, the probe 10 is moved longitudinally within the pipeline 26 along with the pig 38, as indicated by arrow 40 in FIG. 1. As the probe 10 travels through the pipeline 26, a first set of images are captured and registered in the manner explained per se above (i.e. by projecting IR light onto the pipeline's inner wall and registering an image of the projected IR light on the inner wall). The images are preferably captured at certain positions along the pipeline 30, for instance one image every two meters, or at predefined time intervals. The captured images are stored in the removable memory 22, and subsequently transferred to the processing means 24. The processing means 24 then analyses the images and detects the pipeline diameter (hence without deposits) at said certain positions along the pipeline 26. Then, in a secondary stage, the probe 10 is again inserted into and moved through the filled pipeline 26, capturing a second set of images at said certain positions along the pipeline 26. The second set of images is also transferred to and analysed by the processing means 24 for detection of the averaged or detailed pipeline diameter (hence with any deposits) at said certain positions along the pipeline 26. The processing means 24 then compares the images of the first and the second sets in order to determine the thickness of any deposit of material on the inside of the pipeline 26. Also, a profile of the deposits along the length of the pipeline may be produced, by pasting the the images together and form a long image of the whole pipeline.

The secondary stage may be repeated a plurality of times to monitor how the deposit thickness varies along the pipeline 26 length over time. In a subsequent secondary stage, the current deposit thickness may be determined by comparison to a previous image from the preliminary stage without any deposit. Alternatively, the current deposit thickness may be determined by comparison to a previous image (from a previous secondary stage) of the inner wall of the structure including a deposit of material with known thickness. Also, the determined deposit thickness may be the absolute thickness, and/or the relative thickness compared to a previous measurement. The relative thickness may for instance be an increase in deposit thickness, or a decrease in deposit thickness. The latter may be the result of a cleaning operation of the pipeline. Beneficially, the secondary stage(s), as well as the preliminary stage, may be carried out during production when the pipeline 26 is filled with e.g. oil, as explained above. Also, the setup of the device 10, such as the position of the camera 18, the focal length of the lens 20, etc., should remain constant or fixed over the first and second stages to facilitate comparison between images from the first and second stages.

Another example of a routine for surveying or monitoring the pipeline 26 includes performing said secondary stage one or more times, and compare the registered images to the pipeline diameter according to the pipeline specification (or to images from a previous secondary stage measurement). In this routine, the above mentioned primary stage may be omitted.

Also, the probe 10 may be permanentry installed (or at least installed for a reasonably long time) at one place in the pipeline 26, to monitor deposition at this location. The skilled person realizes that the present invention by no means is limited to the embodiment(s) described above. On the contrary, many modifications and variations are possible within the scope of the appended claims. For instance, the present invention is applicable to all kinds of structures or process equipment that handle hydrocarbon streams containing components that possibly deposit on the pipe wall, e.g. wax, scale, hydrates etc.

Also, instead of having a removable memory, the probe may be provided with a wired or wireless interface for providing (e.g. transmitting) a registered image to the processing means. Further, the processing means may be included in the probe.

Also, for independent operation of the probe (without the pig 38), the probe s itself may be adapted to be propelled by means of the pressure of the product in the pipeline, or comprise drive means (e.g. wheels) for movement of the probe through the pipeline. In the latter case, the probe may be moved through an unfilled pipeline.

The invention claimed is:

1. A method of measuring a thickness of wax deposited on an inner wall of a pipeline, the pipeline carrying oil with wax components susceptible to deposit on said wall as the oil flows therethrough, wherein the method comprises:
projecting infrared light onto the inner wall of the pipeline along a line corresponding to the intersection between the inner wall of the pipeline and a cross-sectional plane of the pipeline;
registering an image of the infrared light projected on the inner wall of the pipeline; and
determining the thickness of the wax on the inner wall of the pipeline based on the registered image.

2. The method according to claim 1, wherein the projected light is emitted at about 1100 nm-1700 nm in wavelength, preferably at about 1300 nm-1675 nm in wavelength, and more preferably at about 1550 nm-1625 nm in wavelength.

3. The method according to claim 1, further comprising determining any variations in thickness of the wax on the inner wall of the structure along said line.

4. The method according to claim 3, further comprising determining the flow regimen in a multiphase flow in the pipeline based on the determined variation in thickness.

5. The method according to claim 1, wherein said medium is flowing or conveyed in the pipeline, and wherein the step of projecting infrared light onto the inner wall of the pipeline along a line corresponding to the intersection between the inner wall of the pipeline and a cross-sectional plane of the pipeline and the step of registering an image of the infrared light projected on the inner wall of the pipeline are performed by a device moved longitudinally within the pipeline by means of said flowing or conveyed medium.

6. The method according to claim 1, wherein the step of determining the thickness of the wax on the inner wall of the pipeline based on the registered image includes comparing the registered image with a previous image of the inner wall of the pipeline or with the known inner diameter of the pipeline without deposit.

7. The method according to claim 2, further comprising determining any variations in thickness of the wax on the inner wall of the structure along said line.

8. The method according to claim 2, wherein said medium is flowing or conveyed in the pipeline, and wherein the step of projecting infrared light onto the inner wall of the pipeline along a line corresponding to the intersection between the inner wall of the pipeline and a cross-sectional plane of the pipeline and the step of registering an image of the infrared light projected on the inner wall of the pipeline are performed by a device moved longitudinally within the pipeline by means of said flowing or conveyed medium.

9. The method according to claim 3, wherein said medium is flowing or conveyed in the pipeline, and wherein the step of projecting infrared light onto the inner wall of the pipeline along a line corresponding to the intersection between the inner wall of the pipeline and a cross-sectional plane of the pipeline and the step of registering an image of the infrared light projected on the inner wall of the pipeline are performed by a device moved longitudinally within the pipeline by means of said flowing or conveyed medium.

10. The method according to claim 4, wherein said medium is flowing or conveyed in the pipeline, and wherein the step of projecting infrared light onto the inner wall of the pipeline along a line corresponding to the intersection between the inner wall of the pipeline and a cross-sectional plane of the pipeline and the step of registering an image of the infrared light projected on the inner wall of the pipeline are performed by a device moved longitudinally within the pipeline by means of said flowing or conveyed medium.

11. The method according to claim 2, wherein the step of determining the thickness of the wax on the inner wall of the pipeline based on the registered image includes comparing the registered image with a previous image of the inner wall of the pipeline or with the known inner diameter of the pipeline without deposit.

12. The method according to claim 3, wherein the step of determining the thickness of the wax on the inner wall of the pipeline based on the registered image includes comparing the registered image with a previous image of the inner wall of the pipeline or with the known inner diameter of the pipeline without deposit.

13. The method according to claim 4, wherein the step of determining the thickness of the wax on the inner wall of the pipeline based on the registered image includes comparing the registered image with a previous image of the inner wall of the pipeline or with the known inner diameter of the pipeline without deposit.

14. The method according to claim 5, wherein the step of determining the thickness of the wax on the inner wall of the pipeline based on the registered image includes comparing the registered image with a previous image of the inner wall of the pipeline or with the known inner diameter of the pipeline without deposit.

15. The method according to claim 1, wherein the oil is carried in a multiphase flow which contains a further fluid which is less susceptible to produce a deposit on said wall than the oil, wherein the method further comprises using the registered image to determine the flow regime.

16. The method according to claim 15, wherein the flow regime is determined to be one of: i) dispersed flow; ii) stratified flow; and iii) wavy or slug flow.

17. The method according to claim 15, wherein the using step comprises analyzing the image to determine the location of the oil and or the fluid in the pipeline.

18. The method according to claim 15, wherein said line extends around the full circumference of the pipeline, and the using step comprises analyzing the image to determine the flow regime performed for the full circumference.

19. The method according to claim 18, wherein said analyzing step comprises analyzing successive sections of the image along the line.

20. The method according to claim 15, which further comprises associating the image with fluid type and location within the pipeline.

21. The method according to claim 15, further comprising associating a part of the image with the presence of oil, and other parts with the presence of the further fluid.

22. A method of determining the flow regime in a pipeline carrying oil with wax components susceptible to deposit on an inner wall of the pipeline and a further fluid in a multiphase flow, the method comprising:
  determining the thickness of the wax deposited on the wall of the pipeline by performing the method of claim 1; and
  using the registered image to determine the multiphase flow regime in the pipeline as being one of: i) dispersion flow; ii) stratified flow; and iii) wavy or slug flow.

* * * * *